(12) United States Patent
Ichihashi et al.

(10) Patent No.: US 7,801,214 B2
(45) Date of Patent: Sep. 21, 2010

(54) METHOD AND APPARATUS FOR CONTROLLING ENCODING RATE AND QUANTIZATION SCALES

(75) Inventors: Hideyuki Ichihashi, Saitama (JP); Yuji Ando, Kanagawa (JP)

(73) Assignee: Sony Corporation, Tokyo (JP)

( * ) Notice: Subject to any disclaimer, the term of this patent is extended or adjusted under 35 U.S.C. 154(b) by 1108 days.

(21) Appl. No.: 10/989,709

(22) Filed: Nov. 16, 2004

(65) Prior Publication Data

US 2005/0129112 A1  Jun. 16, 2005

(30) Foreign Application Priority Data

Nov. 18, 2003  (JP) ............................ 2003-388259

(51) Int. Cl.
    *H04B 1/66* (2006.01)
(52) U.S. Cl. ............................................. 375/240.04
(58) Field of Classification Search ............. 375/240.04
    See application file for complete search history.

(56) References Cited

U.S. PATENT DOCUMENTS 5,751,378 A * 5/1998 Chen et al. .................. 348/700

6,094,455 A * 7/2000 Katta .................... 375/240.05
6,961,375 B1 * 11/2005 Mihara .................. 375/240.01

FOREIGN PATENT DOCUMENTS

| JP | 1992/04-255190 | 9/1992 |
|----|---------------|--------|
| JP | 1998/10-075452 | 3/1998 |
| JP | 1998/10-164588 | 6/1998 |
| JP | 2000/152228 | 5/2000 |

OTHER PUBLICATIONS

Japanese Office Action mailed Oct. 14, 2008 in counterpart Japanese Application No. 2003-388259.

* cited by examiner

*Primary Examiner*—Y. Lee
*Assistant Examiner*—Richard Torrente
(74) *Attorney, Agent, or Firm*—Finnegan, Henderson, Farabow, Garrett & Dunner, L.L.P.

(57) ABSTRACT

A data processing apparatus able to generate encoded data able to give a high quality decoded image, wherein a Q-calculation circuit specifies a bit rate by which the encoded data is decoded at the time of decoding based on encoded data, then the Q-calculation circuit controls quantization scales of a quantization circuit based on the specified bit rate.

20 Claims, 11 Drawing Sheets

PROCESSING OF 10

PROCESSING OF 12

PROCESSING OF 13

PROCESSING OF 16

PROCESSING OF 34

PROCESSING OF S42

METHOD AND APPARATUS FOR CONTROLLING ENCODING RATE AND QUANTIZATION SCALES

This application claims priority from Japanese Patent Application no. 2003-388259, filed Nov. 18, 2003.

BACKGROUND OF THE INVENTION

1. Field of the Invention

The present invention relates to a data processing apparatus able to suitably determine quantization scales and a method and an encoding device of the same.

2. Description of the Art

In recent years, apparatuses have been developed based on the standards of the MPEG (Moving Picture Experts Group), JVT (Joint Video Team), etc. handling image data and, at that time, aiming at higher efficiency transmission and storage of information by utilizing the redundancy peculiar to image data in order to compress the data by a discrete cosine transform or other orthogonal transform and motion compensation. In the encoding device of such standards, high efficiency encoding is realized by utilizing local information of the image. In an image, by nature, even if complex parts in the image are encoded with a rougher quantization than that for other parts, deterioration of the image quality is hard to see by the naked eye.

Accordingly, an encoding device of the art divides an image into a plurality of parts, detects the degree of complexity of the image for each part, and, based on the results of detection, roughly quantizes the complex parts of the image and finely quantizes the parts which are not complex so as to reduce the amount of data while suppressing the effect of deterioration of image quality. Such information of the degree of complexity of an image is referred to as activity. An encoding device of the art calculates the activity of the image data to be quantized and generates quantization scales prescribing the quantization scale for each picture based on the activity. Namely, the encoding device determines the amount of bits allocated to a picture for each picture. The encoded data generated by the encoding device is stored in a buffer coded picture buffer (CPB) in a decoding device, then pictures composing the encoded data are sequentially supplied to a decoding unit at a predetermined picture rate to be decoded. Here, the amount by which the amount of storage of data of the buffer CPB is decreased due to one picture being supplied from the buffer CPB to the decoding unit depends upon the amount of data of the picture, that is, the quantization parameter of the picture. Accordingly, the encoding device must determine the quantization scales so as not to cause overflow or underflow of the buffer CPB of the decoding device.

An encoding device of the related art, however, determines the quantization scale of each picture based on only the activity of the image data to be quantized, therefore the amounts of data of the pictures finally encoded cannot be controlled so as to suitably maintain the state of the buffer CPB in some cases and there is therefore the problem that the quality of the decoded image being low.

SUMMARY OF THE INVENTION

An object of the present invention is to provide a data processing apparatus able to generate encoded data able to give a decoded image of a high quality and a method and encoding device of the same.

In order to attain the above object, according to a first aspect of the invention, there is provided a data processing apparatus for determining quantization scales of quantization when encoding processed data by quantization, comprising a specifying circuit for specifying a bit rate by which encoded data is supplied for decoding at the time of decoding based on encoded data obtained by the encoding and a quantization control circuit for controlling the quantization scales based on the bit rate specified by the specifying circuit.

The mode of operation of the data processing apparatus of the first aspect of the invention is as follows. First, the specifying circuit specifies the bit rate by which the encoded data is supplied for decoding at the time of decoding based on encoded data obtained by encoding. Next, the quantization control circuit controls the quantization scales based on the bit rate specified by the specifying circuit.

According to a second aspect of the invention, there is provided a data processing method for determining quantization scales of quantization when encoding processed data by quantization, comprising a first step of specifying the bit rate by which the encoded data is supplied for decoding at the time of decoding based on the encoded data obtained by the encoding and a second step of controlling the quantization scales based on the bit rate specified at the first step.

The mode of operation of the data processing method of the second aspect of the invention is as follows. First, the first step specifies the bit rate by which the encoded data is supplied for decoding at the time of decoding based on the encoded data obtained by the encoding. Next, the second step controls the quantization scales based on the bit rate specified at the first step.

According to a third aspect of the invention, there is provided an encoding device comprising a quantization scale calculation circuit for calculating quantization scales; a quantization circuit for quantizing processed data based on the quantization scales calculated by the quantization scale calculation circuit; and an encoding circuit for generating encoded data by encoding the quantized result of the quantization circuit, wherein the quantization scale calculation circuit comprises a specifying circuit for specifying the bit rate by which the encoded data is supplied for decoding at the time of decoding based on the encoded data generated by the encoding circuit and a quantization control circuit for calculating the quantization scales based on the bit rate specified by the specifying circuit.

The mode of operation of the encoding device of the third aspect of the invention is as follows. The specifying circuit of the quantization scale calculation circuit specifies the bit rate by which the encoded data is supplied for decoding at the time of decoding based on the encoded data generated by the encoding circuit. Next, the quantization control circuit calculates the quantization scales based on the bit rate specified by the specifying circuit. Next, the quantization circuit quantizes the processed data based on the quantization scales calculated by the quantization control circuit. Next, the encoding circuit encodes the quantized result of the quantization circuit to generate the encoded data.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
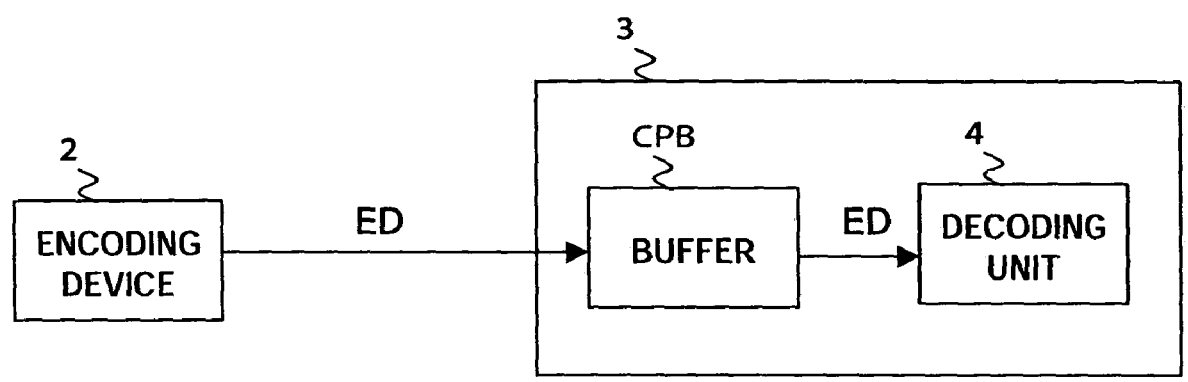
FIG. 1 is a view of the overall configuration of an image processing system of an embodiment of the present invention.

Below, an explanation will be given of an image processing apparatus of a preferred embodiment for solving the above problems and a method and an encoding device of the same. FIG. 1 is a view of the overall configuration of an image processing system 1 of the present embodiment. As shown in FIG. 1, the image processing system 1 has an encoding device 2 and a decoding device 3. The encoding device 2 generates encoded data ED (bit stream) compressed by a discrete cosine transform, Karhunen-Loeve transform, or other orthogonal transform and motion compensation, modulates the encoded data ED, then transmits the same via a satellite broadcast wave, cable TV network, telephone network, mobile phone network, or other transmission media. The decoding device 3 demodulates for example the encoded data ED received from the encoding device 2, then stores the same in the buffer CPB, supplies the encoded data ED read out from the buffer CPB (storage circuit of the present invention) to the decoding unit 4, and generates and utilizes the image data decoded by inverse transform to the orthogonal transform at the time of the encoding and motion compensation at the decoding unit 4. Here, the amount by which the storage of data of the buffer CPB is reduced due to one picture being supplied from the buffer CPB to the decoding unit 4 depends upon the amount of data of the picture, that is the quantization parameter of the picture. The encoding device 2 determines the quantization scales so as not to cause overflow or underflow of the buffer CPB of the decoding device 3 as will be explained later. Note that the transmission medium may also be recording medium such as an optical disc, magnetic disc, or semiconductor memory. The image processing system 1 is characterized by the method of calculation of the quantization scales in the encoding device 2.

Figure 2:
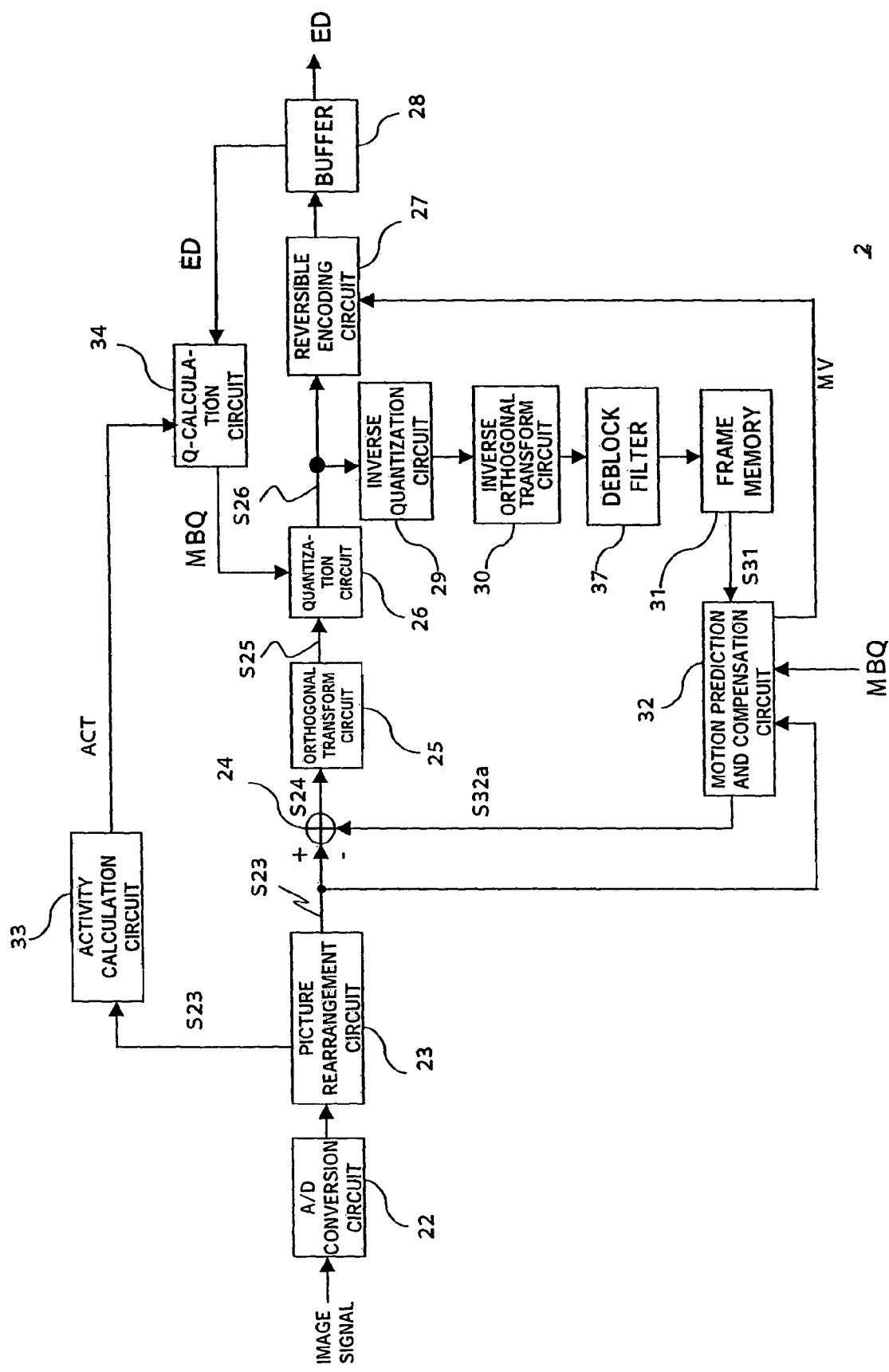
FIG. 2 is a view of the configuration of an encoding device 2 shown in FIG. 1.

Below, an explanation will be given of the encoding device 2 shown in FIG. 1. The encoding device 2 corresponds to the encoding device of the present invention. FIG. 2 is a view of the configuration of the encoding device 2 shown in FIG. 1. As shown in FIG. 2, the encoding device 2 has for example an A/D conversion circuit 22, a picture rearrangement circuit 23, a processing circuit 24, an orthogonal transform circuit 25, a quantization circuit 26, a reversible encoding circuit 27, a buffer 28, an inverse quantization circuit 29, an inverse orthogonal transform circuit 30, a frame memory 31, an activity calculation circuit 33, a Q-calculation circuit 34, a motion prediction and compensation circuit 32, and a deblock filter 37.

The quantization circuit 26 corresponds to the quantization circuit of the third aspect of the invention, the reversible encoding circuit 27 corresponds to the encoding circuit of the third aspect of the invention, and the Q-calculation circuit 34 corresponds to the data processing apparatus of the first aspect of the invention and the quantization scale calculation circuit of the third aspect of the invention.

Below, an explanation will be given of components of the encoding device 2 shown in FIG. 2. The A/D conversion circuit 22 converts an input analog image signal comprised of a luminance signal Y and color difference signals Pb and Pr to a digital image signal and outputs this to the picture rearrangement circuit 23. The picture rearrangement circuit 23 outputs image data S23 (processed data of the present invention), obtained by rearranging the frame image signals in the image signal input from the A/D conversion circuit 22 to a sequence for encoding in accordance with a group of picture (GOP) structure comprised of picture types I, P, and B, to the processing circuit 24, the motion prediction and compensation circuit 32, and the activity calculation circuit 33.

When the image data S23 is to be inter-encoded, the processing circuit 24 generates image data S24 indicating the difference between the image data S23 and predicted image data S32a input from the motion prediction and compensation circuit 32 and outputs this to the orthogonal transform circuit 25. When the image data S32 is to be intra-encoded, the processing circuit 24 outputs the image data S23 as the image data S24 to the orthogonal transform circuit 25. The orthogonal transform circuit 25 applies a discrete cosine transform, Karhunen-Loeve transform, or other orthogonal transform to the image data S24 to generate image data (for example DCT coefficient signal) S25 and outputs this to the quantization circuit 26. The quantization circuit 26 quantizes the image data S25 in units of macro blocks MB by the quantization scales MBQ input from the Q-calculation circuit 34 to generate image data S26 and outputs this to the reversible encoding circuit 27 and the inverse quantization circuit 29.

The reversible encoding circuit 27 subjects the image data S26 to variable length encoding or arithmetic encoding to generate the encoded data ED and stores this in the buffer 28. At this time, the reversible encoding circuit 27 encodes the motion vector MV input from the motion prediction and compensation circuit 32 or the difference thereof and stores this in the header data of the encoded data ED. The encoded data ED stored in the buffer 28 is output to the Q-calculation circuit 34 and, at the same time, modulated, then transmitted to for example the decoding device 3 shown in FIG. 1.

The inverse quantization circuit 29 inversely quantizes the image data S26 to generate data and outputs this to the inverse orthogonal transform circuit 30.

The inverse orthogonal transform circuit 30 applies an inverse transform of the orthogonal transform to the image data input from the inverse quantization circuit 29.

The deblock filter 37 stripps block distortion from the image data input from the inverse orthogonal transform circuit 30 to generate image data and stores this in the frame memory 31.

The motion prediction and compensation circuit 32 performs motion prediction and compensation processing based on the image data S31 from the frame memory 31 and the image data S23 from the picture rearrangement circuit 23 and calculates the motion vector NV and the predicted image data S32a. Note that the motion prediction and compensation circuit 32 determines the macroblock type based on the quantization scales MBQ of macroblocks MB from the Q-calculation circuit 34 and performs the motion prediction and compensation processing in unit of blocks prescribed by the determined macroblock type. The motion prediction and compensation circuit 32 outputs the motion vector MV to the reversible encoding circuit 27 and outputs the predicted image data S32a to the processing circuit 24.

When the image data S23 (pictures of the original image) is a sequentially scanned image, the activity calculation circuit 33 uses the luminance signal pixel values to calculate the activity indicating the degree of complexity of the image of the macroblock MB in units of macroblocks MB. Specifically, the activity calculation circuit 33 calculates an average value of the pixel data in unit blocks in units of macroblocks MB or predetermined blocks prescribed in the macroblocks MB. The activity calculation circuit 33 calculates an activity value ACT of a macro block MB based on the pixel data in the unit blocks and square sum of the differences of the calculated average values and outputs this to the Q-calculation circuit 34. The activity value ACT becomes larger as the image of the macroblocks MB becomes more complex.

The Q-calculation circuit 34 calculates the quantization scale PicQ of each picture based on the activity value ACT from the activity calculation circuit 33 and the encoded data ED from the buffer 28. Further, the Q-calculation circuit 34 calculates the quantization scale MBQ of each macro block MB composing each picture based on the calculated quantization scale PicQ and outputs this to the quantization circuit 26 and the motion prediction and compensation circuit 32. Below, the method by which the Q-calculation circuit 34 calculates the quantization scale PicQ based on the encoded data ED will be explained. The Q-calculation circuit 34 considers the state of the buffer CPB of the decoding device 3 shown in FIG. 1 and controls the quantization scale PicQ of each picture, that is, the amount of data of each picture, so that the amount of the encoded data ED stored in the buffer CPB approaches a suitable value (initial value InitialCpb). Here, the number of the pictures read out from the buffer CPB and supplied to the decoding unit 4 in a unit time is a constant number prescribed by the picture rate. Therefore, by controlling the amount of data of each picture at the Q-calculation circuit 34, the amount of data (amount of buffer storage) of the encoded data ED stored in the buffer CPB can be controlled.

Figure 3:
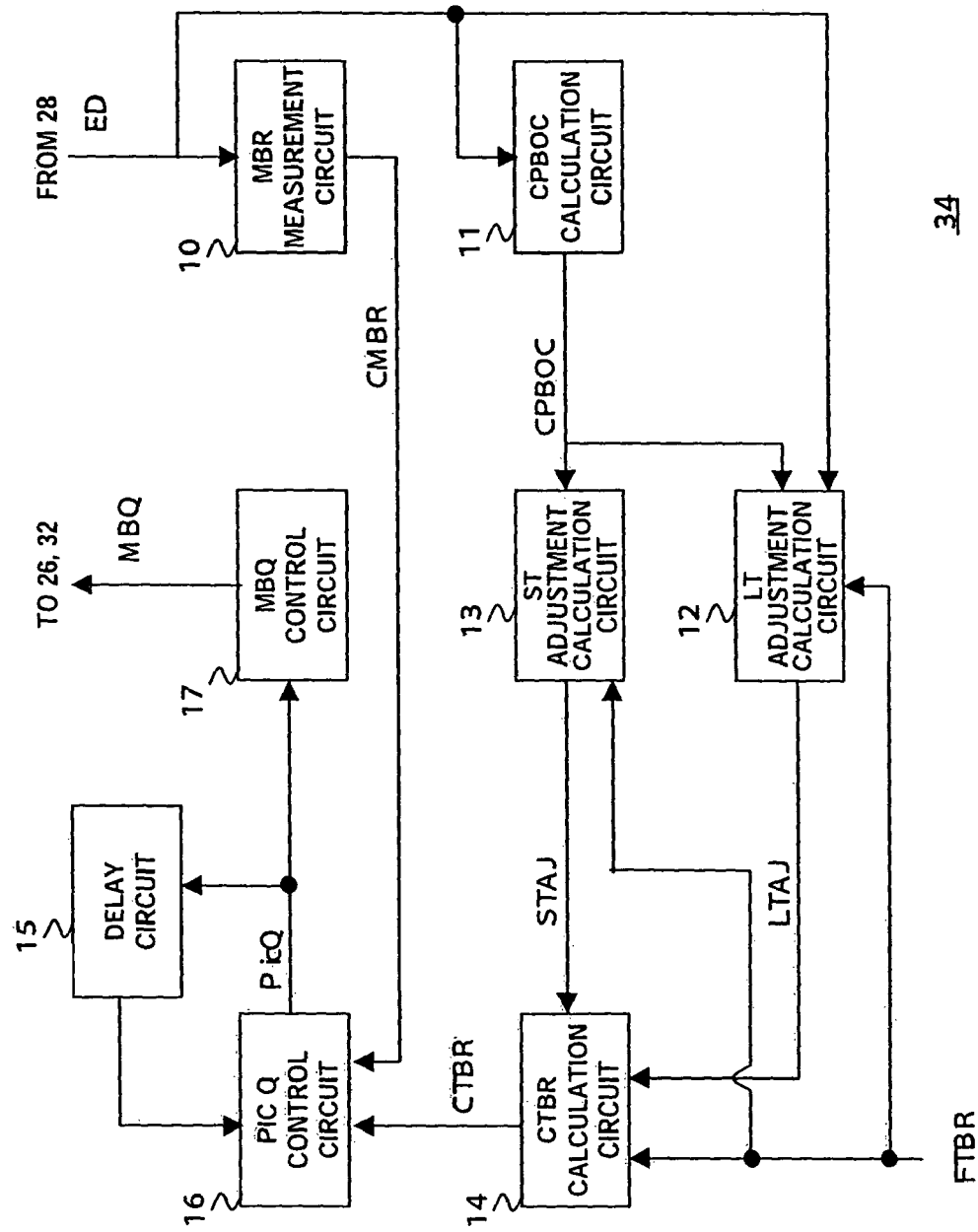
FIG. 3 is a view of the configuration of a Q-calculation circuit shown in FIG. 2 relating to a part for generating quantization scales MBQ based on encoded data ED.

Below, a detailed explanation will be given of the configuration of the Q-calculation circuit 34 shown in FIG. 2. FIG. 3 is a view of the configuration of the Q-calculation circuit 34 shown in FIG. 2 relating to the part for generating a quantization scale MBQ based on the encoded data ED. As shown in FIG. 3, the Q-calculation circuit 34 has for example an MBR measurement circuit 10, a CPBOC calculation circuit 11, an LT adjustment calculation circuit 12, an ST adjustment calculation circuit 13, a CTBR calculation circuit 14, a delay circuit 15, a PicQ control circuit 16, and an MBQ control circuit 17. In FIG. 3, the MBR measurement circuit 10 corresponds to the specifying circuit of the first and third aspects of the invention, and the PicQ control circuit 16 corresponds to the quantization control circuit of the first and third aspects of the invention. Further, the CPBOC calculation circuit 11 corresponds to the index generation circuit of the first aspect of the invention, and the LT adjustment calculation circuit 12, the ST adjustment calculation circuit 13, and the CTBR calculation circuit 14 correspond to the target calculation circuit of the first aspect of the invention.

MBR Measurement Circuit 10

Figure 4:
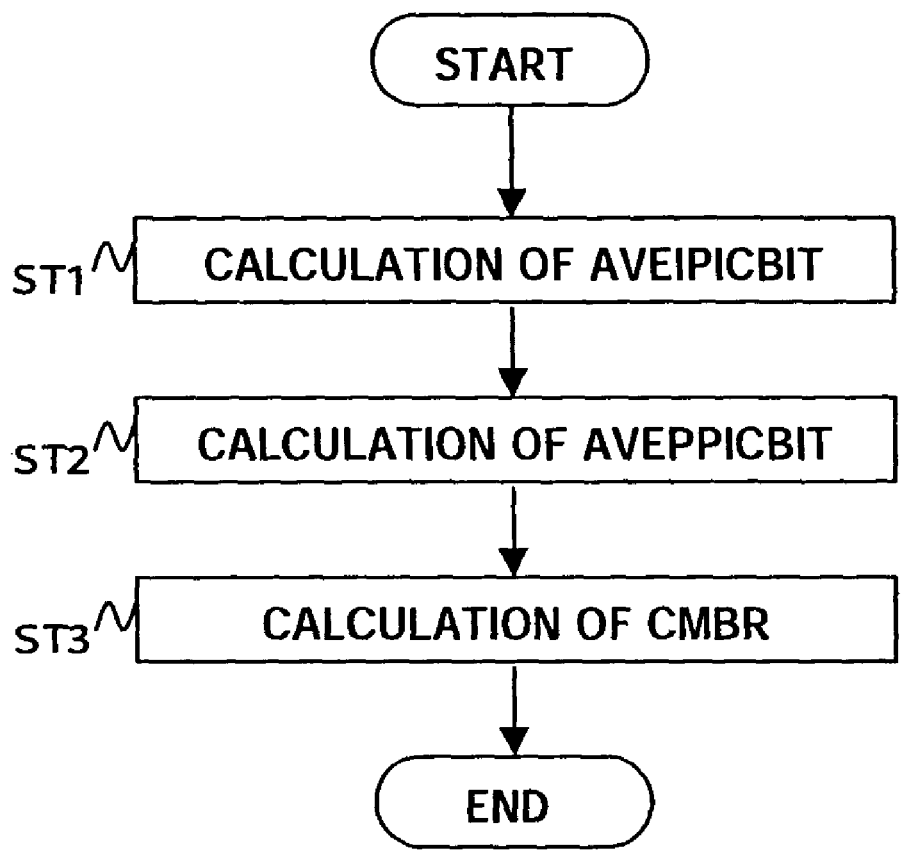
FIG. 4 is a flow chart for explaining processing of an MBR measurement circuit shown in FIG. 3.

The MBR measurement circuit 10 calculates a measurement bit rate CMBR (bit rate specified by the specifying circuit of the present embodiment) indicating the average amount of bits (amount of data) of pictures composing the encoded data ED based on the encoded data ED input from the buffer 28 shown in FIG. 2 and outputs this to the PicQ control circuit 16. The measurement bit rate CMBR indicates the bit rate by which the encoded data ED is read out from the buffer CPB and output to the decoding unit 4 in the decoding device 3 shown in FIG. 1. FIG. 4 is a flow chart for explaining the processing of the MBR measurement circuit 10.

Step ST1

The MBR measurement circuit 10 calculates an average amount of bits AveIPicBit of I-pictures composing the encoded data ED input in the past.

Step ST2

The MBR measurement circuit 10 calculates an average amount of bits AvePPicBit of P-pictures composing the encoded data ED input in the past.

Step ST3

The MBR measurement circuit 10 calculates the measurement bit rate CMBR by the following equation (1) based on the AveIPicBit calculated at step ST1 and the AvePPicBit calculated at step ST2.

$$CMBR=PicR*(AveIPicBit+ AvePPicBit*PPicNumInGop)/TotalPicNumInGop \quad (1)$$

In equation (1), "TotalPicNumInGop" indicates the number of pictures in a single GOP. It is a constant set up in advance. Further, "PPicNumInGop" indicates (TotalPicNumInGop−1).

CPBOC Calculation Circuit 11

The CPBOC calculation circuit 11 calculates index data CPBOC indicating the amount (amount of data storage) of the encoded data ED stored in the buffer CPB of the decoding device 3 based on the encoded data ED from the buffer 28. The CPBOC calculation circuit 11 outputs the index data CPBOC to the LT adjustment calculation circuit 12 and the ST adjustment calculation circuit 13.

The LT adjustment calculation circuit 12 and the ST adjustment calculation circuit 13 shown below calculate the adjustment amounts LTAJ and STAJ for adjusting the target bit rate CTBR (target bit rate of the present invention) so as not to cause overflow or underflow of the buffer CPB of the decoding device 3.

LT Adjustment Calculation Circuit 12

Figure 5:
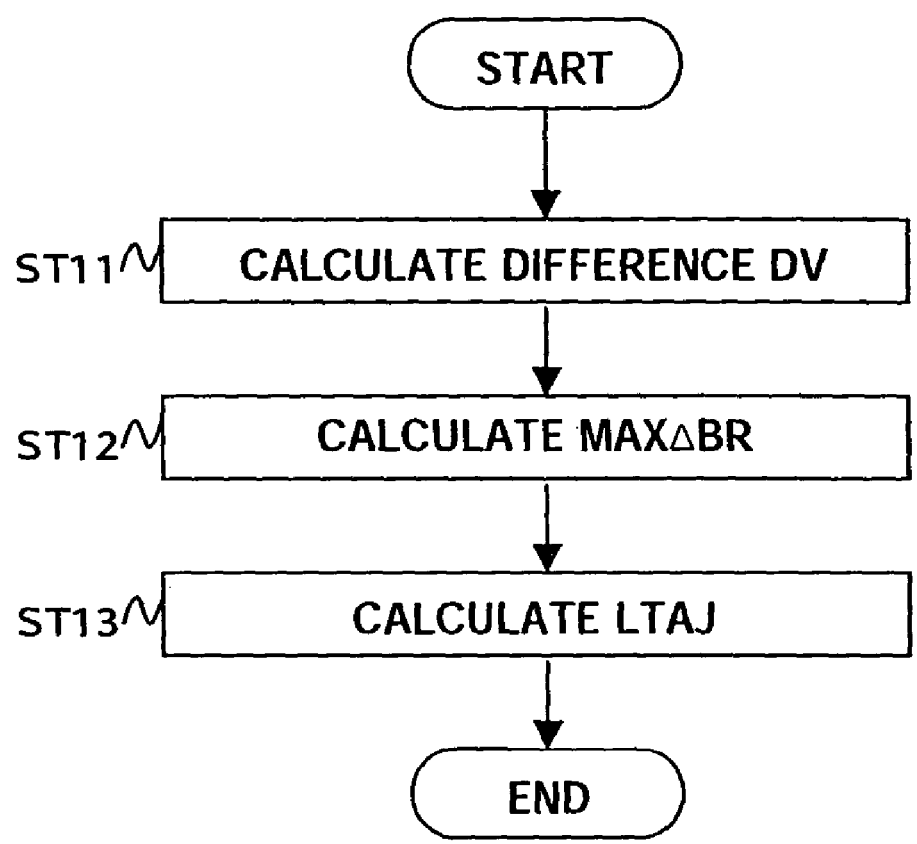
FIG. 5 is a flow chart for explaining processing of an LT adjustment calculation circuit shown in FIG. 3.

The LT adjustment calculation circuit 12 calculates the adjustment amount LTAJ of the target bit rate CTBR explained later based on the index data CPBOC from the CPBOC calculation circuit 11. Here, the adjustment amount LTAJ is for adjustment so that the target bit rate CTBR does not become negative. FIG. 5 is a flow chart for explaining the processing of the LT adjustment calculation circuit 12.

Step ST11

The LT adjustment calculation circuit 12 detects the cumulative amount of bits of the encoded data ED from the buffer 28. Further, the LT adjustment calculation circuit 12 multiplies the final target bit rate FTBR designated from outside the encoding device 2 (final target bit rate of the present invention) and the time from the start of encoding by the encoding device 2 to calculate the predicted amount of generated bits.

Then, the LT adjustment calculation circuit 12 generates difference data DV indicating the difference between the detected added bit amount and the calculated predicted amount of generated bits.

Step ST12

The LT adjustment calculation circuit 12 multiplies the final target bit rate FTBR by ½ to calculate data MaxΔBR.

Step ST13

The LT adjustment calculation circuit 12 calculates the adjustment amount LTAJ of the target bit rate CTBR by the following equation (2) based on the difference data DV generated at step ST11 and the data MaxΔBR calculated at step ST12. Note that, in the following equation (2), Span, Gain, and MinΔBR are constants set in advance.

$$LTAJ=\text{Max}\Delta BR/\{1+\exp\{(-DV+(\text{Max}\Delta BR* \text{Span}/2))*\text{Gain}\}\}-\text{Min}\Delta BR \qquad (2)$$

Figure 6:
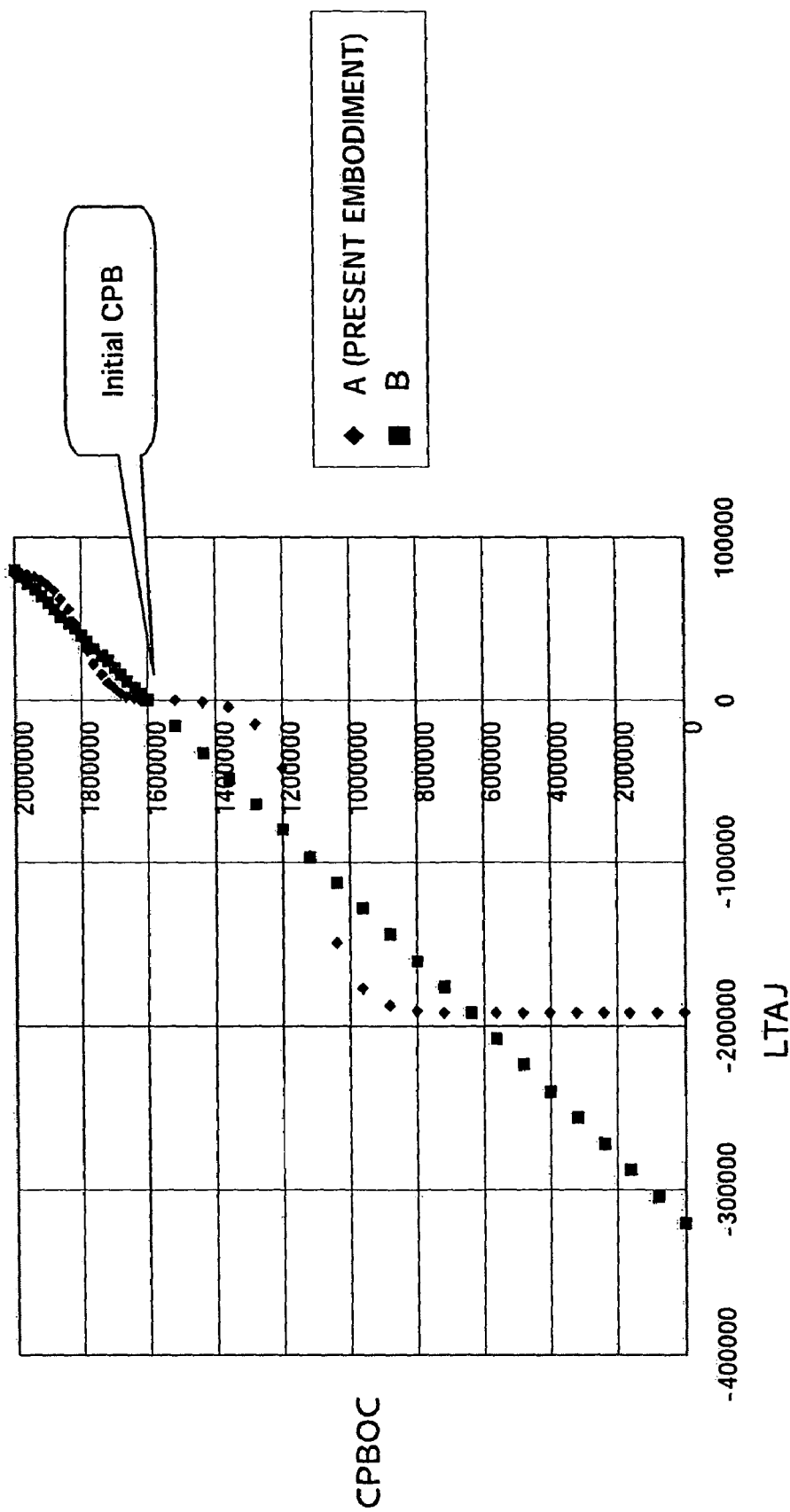
FIG. 6 is a diagram showing the relationship between an adjustment amount LTAJ and index data CPBOC.

FIG. 6 is a view of the relationship between the adjustment amount LTAJ and the index data CPBOC. In FIG. 6, the plot of "A" corresponds to the present embodiment, and the plot of "B" is found from LTAJ=DV/Span. As shown in FIG. 6, the adjustment amount LTAJ has a positive value when the index data CPBOC is the initial value InitialCpb or more, that is, has a value for adjustment so as to raise the target bit rate CTBR. Further, the adjustment amount LTAJ has a negative value when the index data CPBOC is less than the initial value InitialCpb, that is, has a value for adjustment so as to lower the target bit rate CTBR. Further, the adjustment amount LTAJ is prescribed so as not to be smaller than a predetermined value (for example about −190000) even if the index data CPBOC becomes a predetermined value (for example 800000) or less as shown in FIG. 6. Due to this, the target bit rate CTBR becoming negative is avoided. The characteristic of the adjustment amount LTAJ is realized by calculating the adjustment amount LTAJ of the target bit rate CTBR by the LT adjustment calculation circuit 12 according to the above equation (2).

ST Adjustment Calculation Circuit 13

Figure 7:
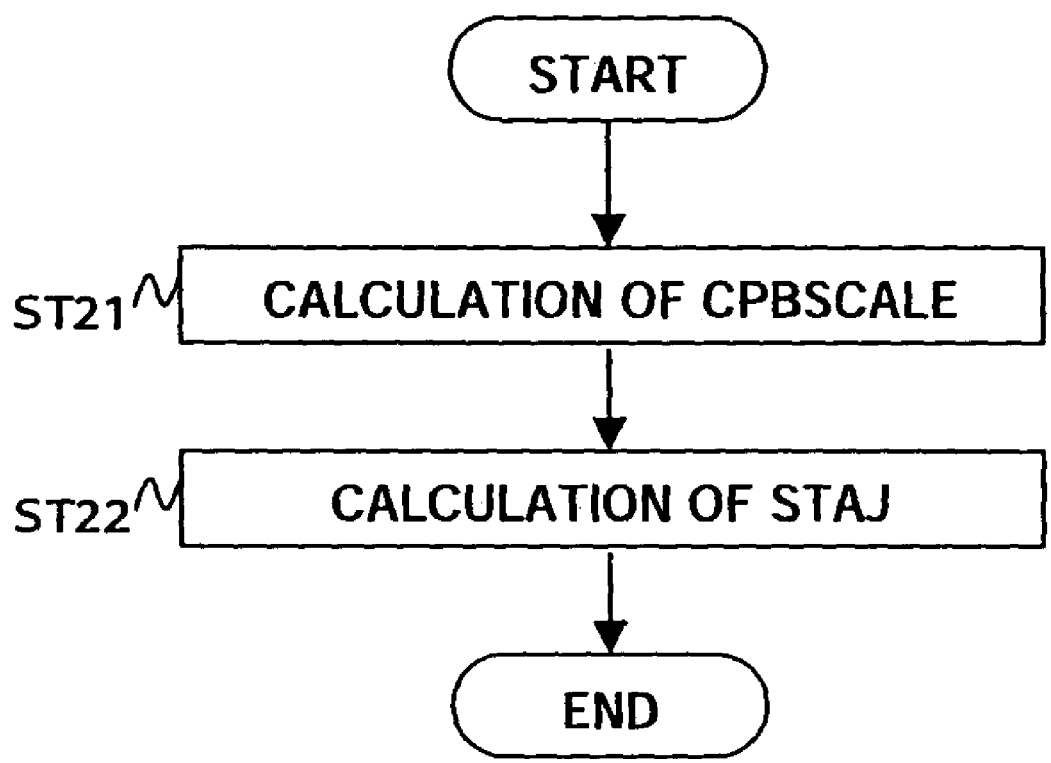
FIG. 7 is a flow chart for explaining processing of an ST adjustment calculation circuit shown in FIG. 3.

The ST adjustment calculation circuit 13 calculates the adjustment amount STAJ of the target bit rate CTBR based on the index data CPBOC from the CPBOC calculation circuit 11. Here, the adjustment amount STAJ acts so as to return the index data CPBOC to the initial value InitialCpb. FIG. 7 is a flow chart for explaining the processing of the ST adjustment calculation circuit 13.

Step ST21

The ST adjustment calculation circuit 13 calculates the data CpbScale according to the following equation (3) by using the index data CPBOC input from the CPBOC calculation circuit 11.

$$CpbScale=-((Scale*(InitCpb-CPBOC)+CPBOC)/((InitCpb-CPBOC)+Scale*CPBOC)) \qquad (3)$$

Figure 8:
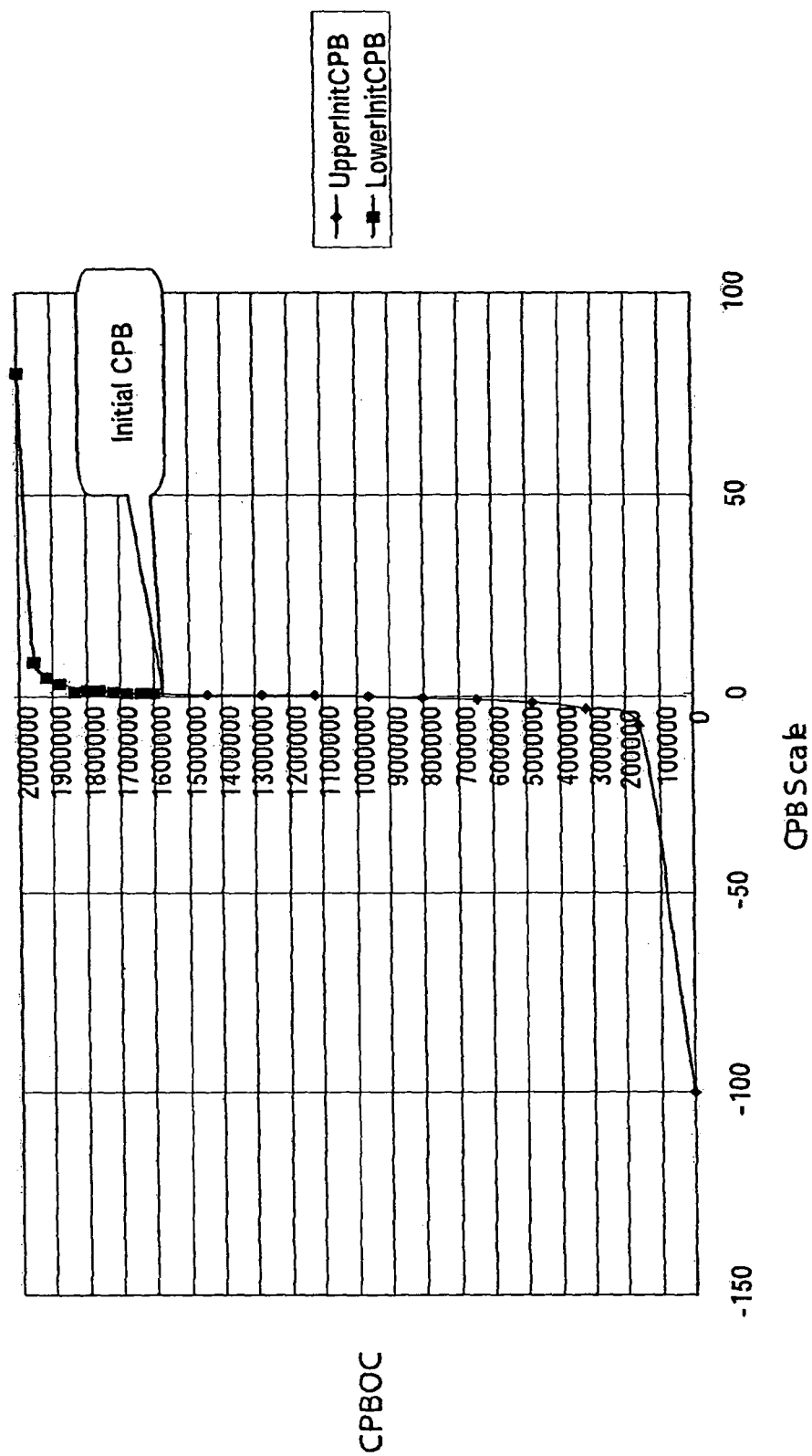
FIG. 8 is a diagram showing the relationship between data CpbScale and the index data CPBOC.

FIG. 8 is a view of the relationship between the data CpbScale and the index data CPBOC. As shown in FIG. 8, the data CpbScale has a positive value when the index data CPBOC is the initial value InitialCpb or more, that is, has a value for adjustment so as to raise the target bit rate CTBR. Further, the data CpbScale has a negative value when the index data CPBOC is less than the initial value InitialCpb, that is, has a value for adjustment so as to lower the target bit rate CTBR. The data CpbScale, as shown in FIG. 8, sharply becomes small in value when the index data-CPBOC becomes a predetermined value (for example 180000) or less. Due to this, the buffer CPB of the decoding device explained above underflowing is avoided. The characteristic of the data CpbScale is realized by calculating the data CpbScale by the ST adjustment calculation circuit 13 according to equation (3).

Step ST22

The ST adjustment calculation circuit 13 calculates the adjustment amount STAJ by multiplying the data CpbScale calculated at step ST21 and the input final target bit rate FTBR according to the following equation (4).

$$STAJ=FTBR*CpbScale \qquad (4)$$

CTBR Calculation Circuit 14

The CTBR calculation circuit 14 adds the input final target bit rate FTBR, the adjustment amount LTAJ input from the LT adjustment calculation circuit 12, and the adjustment amount STAJ input from the ST adjustment calculation circuit 13 according to the following equation (5) to calculates the target bit rate CTBR. The CTBR calculation circuit 14 outputs the target bit rate CTBR to the PicQ control circuit 16.

$$CTBR=FTBR+LTAJ+STAJ \qquad (5)$$

Delay Circuit 15

The delay circuit 15 delays a Q-scale QPic input from the PicQ control circuit 16 by exactly a time corresponding to one picture and outputs it to the PicQ control circuit 16.

PicQ Control Circuit 16

Figure 9:
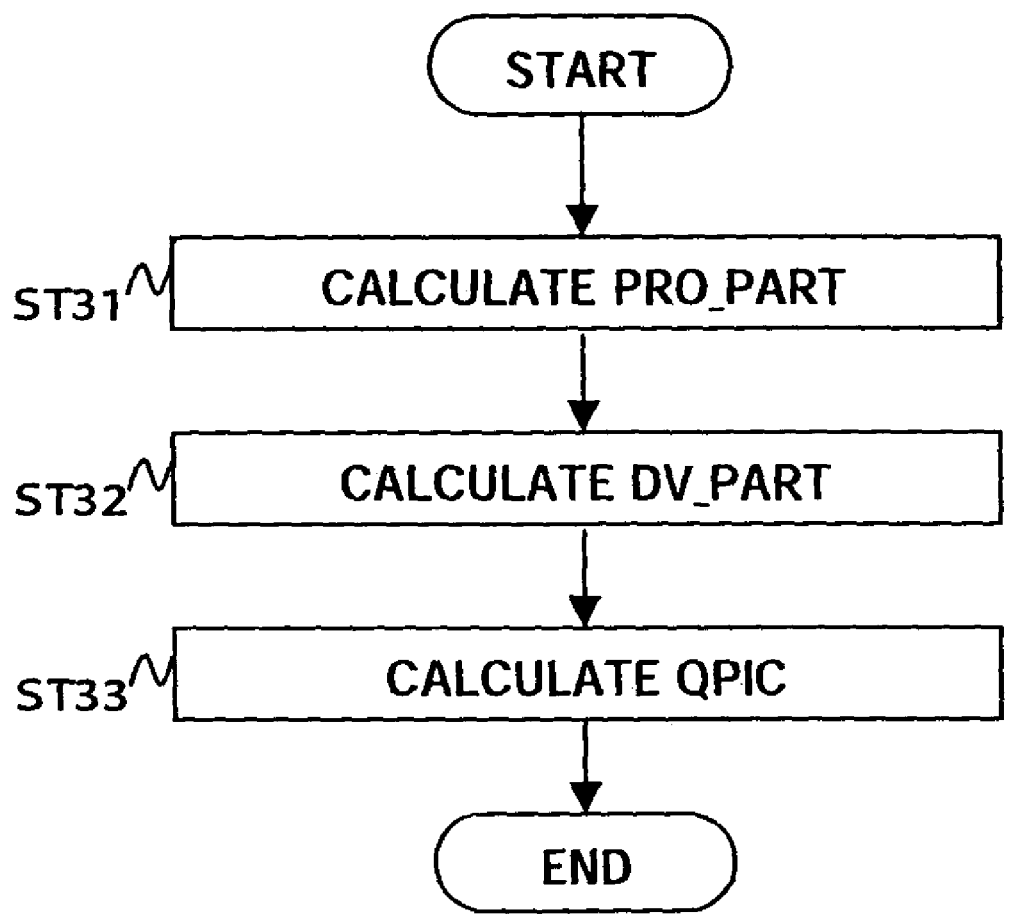
FIG. 9 is a flow chart for explaining processing of a PicQ control circuit shown in FIG. 3.

The PicQ control circuit 16 calculates (determines) the Q-scale PicQ of a picture (quantization scale of the present invention) and outputs this to the delay circuit 15 and the MBQ control circuit 17. The PicQ control circuit 16 calculates the Q-scale PicQ as follows based on the measurement bit rate CMBR input from the MBR measurement circuit 10 and the target bit rate CTBR input from the CTBR calculation circuit 14. Specifically, the PicQ control circuit 16 calculates the Q-scale QPic so as to make the measurement bit rate CMBR approach the target bit rate CTBR. FIG. 9 is a flow chart for explaining the processing of the PicQ control circuit 16.

Step ST31

The PicQ control circuit 16 calculates data PRO_PART according to the following equation (6) by using the measurement bit rate CMBR input from the MBR measurement circuit 10 and the target bit rate CTBR input from the CTBR calculation circuit 14. Kp in Equation (6) is a coefficient for adjusting the response and is prescribed by using for example the measurement bit rate CMBR, the target bit rate CTBR, and the index data CPBOC. By lowering the response, fluctuation of the quantization scales can be suppressed.

$$PRO\_PART=Kp*(CMBR/CTBR-1) \qquad (6)$$

Step ST32

The PicQ control circuit 16 calculates the data DV_PART according to the following equation (7) by using the measurement bit rate CMBR input from the MBR measurement circuit 10 and the target bit rate CTBR input from the CTBR calculation circuit 14. Kd in equation (7) is a coefficient for enhancing the response. Further, n indicates the number of pictures. CMBR[n−1] indicates the CMBR of one picture before the picture corresponding to CMBR[n].

$$DV\_PART=Kd*(CMBR[n]-CMBR[n-1]) \qquad (7)$$

Step ST33

The PicQ control circuit 16 calculates a quantization scale QPic[n] by equation (8) using the quantization scale QPic[n−1] calculated the previous time, the data PRO_PART calculated at step ST31, and the data DV_PART calculated at step ST32

$$QPic[n]=QPic[n-1]*(1+PRO\_PART+DV\_PART) \qquad (8)$$

MBQ Control Circuit 17

The MBQ control circuit 17 calculates the quantization scale MBQ of each macro block MB in a picture based on the quantization scale PicQ of the picture input from the PicQ control circuit 16 and outputs these to the quantization circuit 26 and the motion prediction and compensation circuit 32 shown in FIG. 2.

Figure 10:
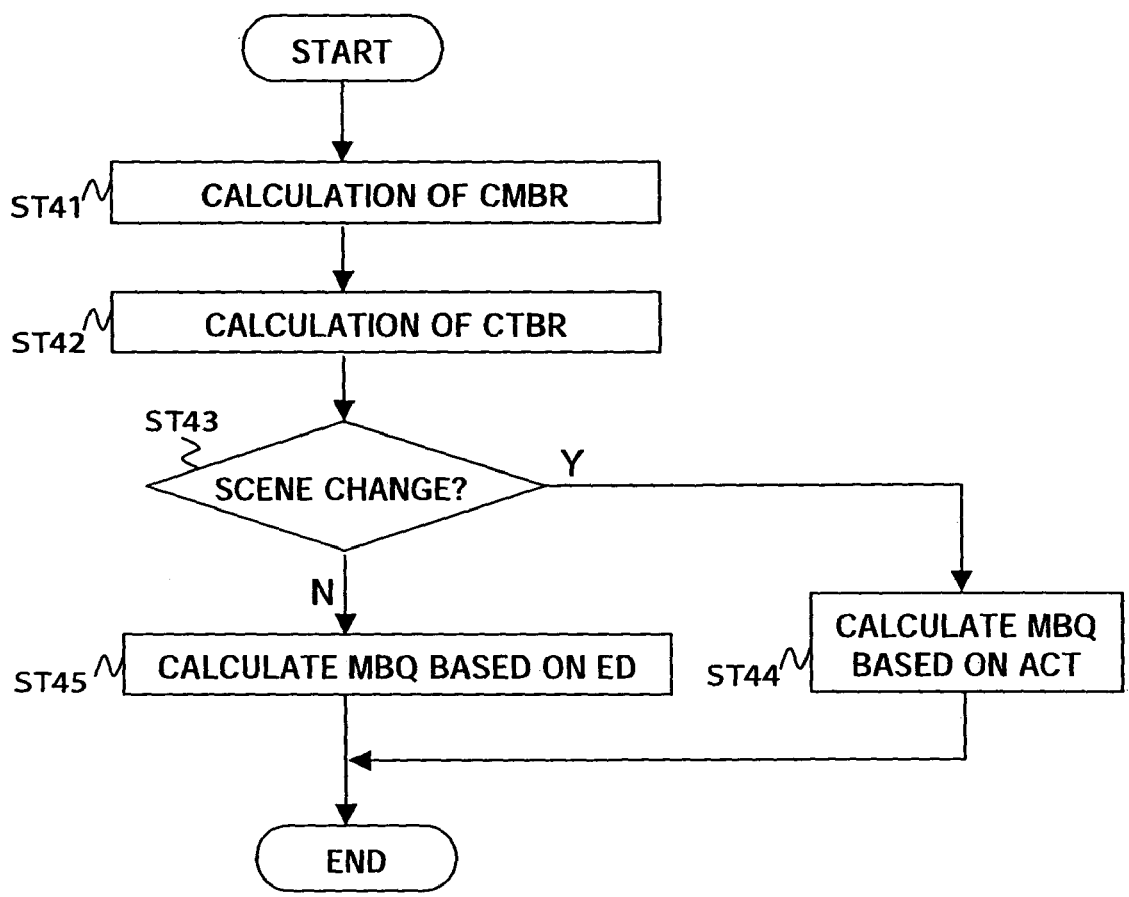
FIG. 10 is a flow chart for explaining the overall operation of the Q-calculation circuit shown in FIG. 3.

Below, an explanation will be given of the overall operation of the Q-calculation circuit 34 shown in FIG. 3. FIG. 10 is a flow chart for explaining the overall operation of the Q-calculation circuit 34 shown in FIG. 3.

Step ST41

The MBR measurement circuit 10 of the Q-calculation circuit 34 shown in FIG. 3 calculates the measurement bit rate CMBR by the routine explained by using FIG. 4.

Step ST42

Figure 11:
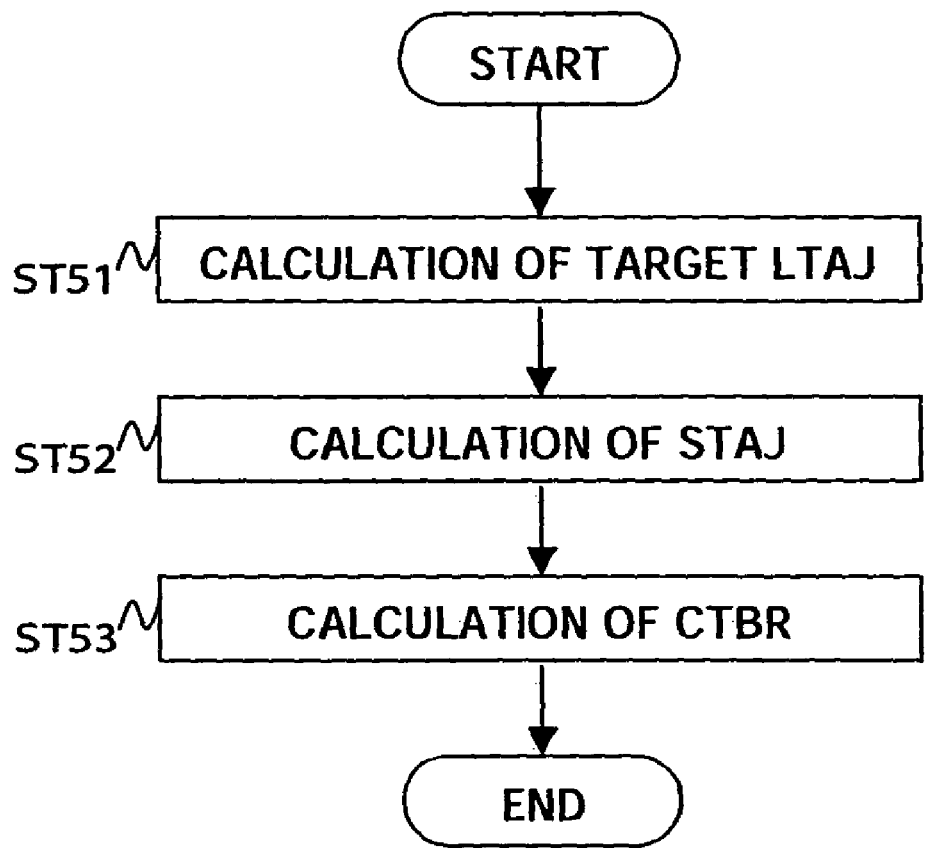
FIG. 11 is a flow chart for explaining processing of step ST42 shown in FIG. 10.

The CPBOC calculation circuit 11, the LT adjustment calculation circuit 12, the ST adjustment calculation circuit 13, and the CTBR calculation circuit 14 shown in FIG. 3 calculate the target bit rate CTBR by the routines explained by using FIG. 5, FIG. 7, and FIG. 9. Namely, as shown in FIG. 11, the LT adjustment calculation circuit 12 calculates the adjustment amount LTAJ (ST51), the ST adjustment calculation circuit 13 calculates the adjustment amount STAJ (ST52), and the CTBR calculation circuit 14 calculates the target bit rate CTBR by using this (ST52).

Step ST43

The Q-calculation circuit 34 decides whether or not the picture to be processed is the first picture after a scene change. When deciding it is the first picture, it proceeds to step ST44, while when not deciding so, it proceeds to step ST45.

Step ST44

The Q-calculation circuit 34 calculates the quantization scale MBQ of each macro block MB of a picture to be processed based on the activity ACT from the activity calculation circuit 33 shown in FIG. 2 and outputs these to the quantization circuit 26 and the motion prediction and compensation circuit 32. Namely, the Q-calculation circuit 34 calculates quantization scales by the same routine as in the related art.

Step ST45

The Q-calculation circuit 34 calculates the quantization scale QPic of each picture as explained by using FIG. 9 based on the measurement bit rate CMBR calculated at step ST41 and the target bit rate CTBR calculated at step ST42, then calculates the quantization scale MBQ of each macro block MB and outputs these to the quantization circuit 26 and the motion prediction and compensation circuit 32.

Next, an explanation will be given of the overall operation of the encoding device 2 shown in FIG. 2. The input image signal is first converted to a digital signal in the A/D conversion circuit 22. Next, in accordance with the GOP structure of the output image compressed information, the picture rearrangement circuit 23 rearranges the image data. Then, the activity calculation circuit 33 generates the activity ACT and outputs this to the Q-calculation circuit 34. The Q-calculation circuit 34 calculates the quantization scales MBQ as explained above based on the activity ACT from the activity calculation circuit 33 and the encoded data ED from the buffer 28 and outputs these to the quantization circuit 26 and the motion prediction and compensation circuit 32.

For image data to be intra-encoded, the image information of the entire image data is input to the orthogonal transform circuit 25. At the orthogonal transform circuit 25, a discrete cosine transform, Karhunen-Loeve transform, or other orthogonal transform is applied. The transform coefficient output by the orthogonal transform circuit 25 is quantized in the quantization circuit 26 and output as the image data S25 to the reversible encoding circuit 27. The quantization circuit 26 quantizes the image data S25 based on the quantization scales QP based on the quantization scales MBQ input from the Q-calculation circuit 34. The reversible encoding circuit 27 applies variable length encoding, arithmetic encoding, or other reversible encoding to the image data S26 to generate the encoded data ED and outputs this to the buffer 28.

Simultaneously, the image data S26 from the quantization circuit 26 is input to the inverse quantization circuit 29, is further subjected to an inverse orthogonal transform at the inverse orthogonal transform circuit 30 whereby it becomes the decoded image data. That image data is stored in the frame memory 31.

On the other hand, for an image to be inter-encoded, first, the image data S23 thereof is input to the motion prediction and compensation circuit 32. Further, the image data S31 of the reference image is read out from the frame memory 31 and output to the motion prediction and compensation circuit 32. Then, the motion prediction and compensation circuit 32 generates the motion vector MV and the predicted image data S32a by using the image data S31 as a reference image.

Then, the processing circuit 24 generates the image data S24 as the difference signal between the image data S23 from the picture rearrangement circuit 23 and the predicted image data S32a from the motion prediction and compensation circuit 32 and outputs the image data S24 to the orthogonal transform circuit 25. Then, the reversible encoding circuit 27 performs variable length encoding, arithmetic encoding, or other reversible encoding processing on the motion vector MV and inserts the result into the header part of the image data. The rest of the processing is the same as that for the image data to be intra-encoded.

As explained above, the encoding device 2 considers the amount of storage of the buffer CPB of the decoding device 3 shown in FIG. 1 and determines the quantization scales MBQ in the Q-calculation circuit 34 based on the encoded data ED from the buffer 28. For this reason, according to the encoding device 2, overflow and underflow of the buffer CPB of the decoding device 3 can be avoided, and the quality of the image decided at the decoding unit 4 can be improved. Further, according to the encoding device 2, as explained by using FIG. 4, the MBR measurement circuit 10 calculates the measurement bit rate CMBR based on the average amount of bits of a plurality of pictures and calculates the target bit rate CTBR based on this. For this reason, large fluctuation of the quantization scales MBQ among the pictures due to the difference of the amounts of bits of the pictures can be avoided. Further, according to the encoding device 2, the processing load of the decoding unit 4 can be averaged. Due to this, the image quality after decoding can be improved. Further, according to the encoding device 2, as shown in equation (8), the PicQ control circuit 16 calculates the quantization scales QPic by feedback. Due to this as well, sharp fluctuations over time of the quantization scales QPic can be suppressed. Further, according to the encoding device 2, by adjusting Kp in equation (6), sharp fluctuations of the quantization scales can be suppressed. Due to this as well, the processing load of the decoding unit 4 can be averaged. Due to this, the image quality after decoding can be improved.

Summarizing the effects of the invention, according to the present invention, a data processing apparatus able to generate encoded data able to give a decoded image of a high quality and a method and encoding device of the same can be provided. The present invention can be applied to a system for quantizing processed data.

While the invention has been described with reference to specific embodiments chosen for purpose of illustration, it should be apparent that numerous modifications could be made thereto by those skilled in the art without departing from the basic concept and scope of the invention.

The invention claimed is:

1. A data processing apparatus for determining quantization scales when encoding processed data, the data processing apparatus comprising:
   a specifying circuit for specifying a bit rate used to provide encoded data for decoding, the bit rate being based on the encoding of the encoded data;
   an activity calculation circuit for calculating an activity value indicating a degree of complexity of the processed data, the processed data including blocks of pixel data having pixel values, wherein the activity value is calculated by:
      determining, using the pixel values, average values corresponding to the blocks, the average values indicating averages of pixel data included in the blocks;
      determining differences between the average values; and
      calculating a square sum of the differences;
   a rearrangement circuit for rearranging the processed data into a sequence of frames of image data, the sequence being based on an order of encoding of the processed data;
   an index generation circuit for generating index data, serving as an index for specifying an amount of data storage of a storage circuit storing the encoded data at a decoding side; and
   a quantization control circuit comprising:
      a target calculation circuit for calculating a target bit rate indicating a target value of the bit rate, wherein the target bit rate is calculated based on the generated index data;
      an adjustment circuit for generating an adjustment amount to adjust the target bit rate; and
      a control circuit for calculating the quantization scales based on the bit rate, the adjusted target bit rate, and the activity value, the quantization scales being used to provide the encoded data for decoding.

2. A data processing apparatus as set forth in claim 1, wherein the quantization control circuit controls the quantization scales to cause the bit rate to approach the target bit rate.

3. A data processing apparatus as set forth in claim 2, wherein the specifying circuit specifies the bit rate for the decoding at the decoding side.

4. A data-processing apparatus as set forth in claim 3, wherein the specifying circuit specifies the bit rate based on an average amount of bits of pictures in past encoded data and a picture rate of the pictures.

5. A data processing apparatus as set-forth in claim 2, wherein the target calculation circuit calculates:
   the target bit rate based on a designated final target bit rate; and
   a difference between a predicted generated amount of bits calculated based on a write time of the encoded data in the storage circuit and a cumulative amount of bits of the encoded data.

6. A data processing apparatus as set forth in claim 2, wherein the target calculation circuit calculates the target bit rate to avoid overflowing and underflowing the storage circuit.

7. A data processing apparatus as set forth in claim 2, wherein the quantization control circuit determines a quantization scale based on a ratio between the bit rate specified by the specifying circuit and the target bit rate, and a previously determined quantization scale.

8. A data processing apparatus as set forth in claim 2, wherein the quantization control circuit determines and controls a new quantization scale to suppress overshoot and undershoot of the bit rate based on a difference between the bit rate and the target bit rate and a previously determined quantization scale.

9. A data processing apparatus as set forth in claim 1, wherein when the encoded data includes a plurality of pictures of a moving picture, the quantization control circuit controls the quantization scales of the plurality of pictures.

10. A data processing apparatus as set forth in claim 1, wherein the quantization control circuit:
    controls the quantization scales based on the bit rate when a picture to be processed is not a first picture after a scene change; and
    controls the quantization scales based on the degree of complexity of the processed data when the picture to be processed is the first picture after a scene change.

11. A data processing apparatus as set forth in claim 1, further comprising:
    a motion prediction and compensation circuit for generating prediction data corresponding to the processed data and generating a motion vector corresponding to the processed data; and a
    processing circuit generating difference data indicating the difference between the processed data and the prediction data.

12. A data processing apparatus as set forth in claim 11, wherein the motion vector is encoded and included in the header of the encoded data.

13. A data processing apparatus as set forth in claim 11, wherein the difference data is encoded and included in the header of the encoded data.

14. A data processing apparatus as set forth in claim 1, further comprising:
    an analog to digital conversation circuit for converting an analog image signal to provide the processed data;
    a deblock filter circuit for stripping block distortion from a portion of the processed data and providing a stripped portion of the processed data; and
    a motion prediction and compensation circuit for generating prediction data corresponding to the processed data and generating a motion vector based on the stripped portion.

15. A data processing apparatus as set forth in claim 1, further comprising:
    a reversible encoding circuit for performing variable length encoding or arithmetic encoding to a first portion of the processed data and a motion vector corresponding to the processed data; and
    a buffer for storing the encoded first portion of processed data and the encoded motion vector received from the reversible encoding circuit.

16. A data processing method for determining quantization scales when encoding processed data including blocks of pixel data having pixel values, the method being executed by using a data processing apparatus and comprising:
    specifying a bit rate used to provide encoded data for decoding, the bit rate being based on the encoding of the encoded data;
    determining, using the pixel values, average values corresponding to the blocks, the average values indicating averages of pixel data included in the blocks;
    determining differences between the average values;
    calculating a square sum of the differences;

calculating, using an activity calculating circuit in the data processing apparatus, an activity value indicating a degree of complexity of the processed data based on the square sum;

rearranging the processed data into a sequence of frames of image data, the sequence being based on an order of encoding of the processed data;

generating index data, serving as an index for specifying an amount of data storage of a storage circuit storing the encoded data at a decoding side;

calculating a target bit rate indicating a target value of the bit rate, wherein the target bit rate is calculated based on the generated index data;

generating an adjustment amount to adjust the target bit rate; and calculating the quantization scales based on the specified bit rate, the adjusted target bit rate, and the activity value, the quantization scales being used to provide the encoded data for decoding.

17. A data processing method as set forth in claim 16, further comprising:

generating prediction data corresponding to the processed data;

generating a motion vector corresponding to the processed data; and generating difference data indicating the difference between the processed data and the prediction data.

18. A data processing method as set forth in claim 17, wherein at least one of the motion vector and difference data is encoded and included in the header of the encoded data.

19. An encoding device comprising:

a quantization scale calculation circuit for calculating quantization scales;

a quantization circuit for quantizing processed data based on the quantization scales;

a rearrangement circuit for rearranging the processed data into a sequence of frames of image data, the sequence being based on an order of encoding of the processed data;

an index generation circuit for generating index data, serving as an index for specifying an amount of data storage of a storage circuit storing the encoded data at a decoding side; and an encoding circuit for generating encoded data by encoding a quantized result of the quantization circuit, wherein the quantization scale calculation circuit comprises:

a specifying circuit for specifying a bit rate used to provide the encoded data for decoding, the bit rate being based on the encoding of the encoded data;

an activity calculation circuit for calculating an activity value indicating a degree of complexity of the processed data, the processed data including blocks of pixel data having pixel values, wherein the activity value is calculated by:

determining, using the pixel values, average values corresponding to the blocks, the average values indicating averages of pixel data included in the blocks;

determining differences between the average values; and calculating a square sum of the differences;

a target calculation circuit for calculating a target bit rate indicating a target value of the bit rate, wherein the target bit rate is calculated based on the generated index data;

an adjustment circuit for generating an adjustment amount to adjust the target bit rate; and a quantization control circuit for calculating the quantization scales based on the bit rate, the adjusted target bit rate, and the activity value, the quantization scales being used to provide the encoded data for decoding.

20. An encoding device as set forth in claim 12, further comprising:

a motion prediction and compensation circuit for generating prediction data corresponding to the processed data and generating a motion vector corresponding to the processed data; and a processing circuit generating difference data indicating the difference between the processed data and the prediction data, wherein at least one of the motion vector and difference data is encoded and included in the header of the encoded data.

* * * * *